(12) United States Patent
Forbes (10) Patent No.: US 7,693,744 B2
(45) Date of Patent: Apr. 6, 2010

(54) OPTIMISED MESSAGES CONTAINING BARCODE INFORMATION FOR MOBILE RECEIVING DEVICES

(75) Inventor: Ronald Forbes, Penicuik (GB)

(73) Assignee: Mobiqa Limited, Edinburgh (GB)

( * ) Notice: Subject to any disclaimer, the term of this patent is extended or adjusted under 35 U.S.C. 154(b) by 1007 days.

(21) Appl. No.: 10/527,632

(22) PCT Filed: Sep. 17, 2003

(86) PCT No.: PCT/GB03/04131

§ 371 (c)(1),
(2), (4) Date: Oct. 6, 2005

(87) PCT Pub. No.: WO2004/022662

PCT Pub. Date: Apr. 1, 2004

(65) Prior Publication Data

US 2006/0111967 A1     May 25, 2006

(30) Foreign Application Priority Data

Sep. 17, 2002   (GB) ................. 0221544.0
May 9, 2003   (GB) ................. 0310692.9

(51) Int. Cl.
    *G06F 17/60*     (2006.01)
    *G06Q 30/00*     (2006.01)
(52) U.S. Cl. ............... 705/14.64; 705/14.67; 705/14.72
(58) Field of Classification Search ................. 705/14, 705/14.64, 14.67, 14.72
See application file for complete search history.

(56) References Cited

U.S. PATENT DOCUMENTS

| | | | |
|---|---|---|---|
| 6,868,426 B1 * | 3/2005 | Mankoff | 707/104.1 |
| 7,009,650 B2 * | 3/2006 | Kashio | 348/333.01 |
| 7,028,902 B2 * | 4/2006 | Xu et al. | 235/462.1 |
| 7,031,945 B1 * | 4/2006 | Donner | 705/64 |

(Continued)

FOREIGN PATENT DOCUMENTS

EP     0 713 198 A2     5/1996

(Continued)

OTHER PUBLICATIONS

International Search Report dated Feb. 10, 2004.

(Continued)

*Primary Examiner*—James W Myhre
*Assistant Examiner*—Michael Goldman
(74) *Attorney, Agent, or Firm*—Edwards Angell Palmer & Dodge LLP; George N. Chaclas (57) ABSTRACT

A system for delivering coupons containing barcodes to a mobile device such as a mobile phone is disclosed. A message processor means (106) generates message data comprising a coupon. A message optimizer means (116) generates an optimized message responsive to the message data and the capabilities of the mobile device (124). Preferably the capabilities of the mobile device comprise device attribute associated with a mobile device type, and are stored in a database means (110). The optimized message is transmitted to the mobile device. For basic mobile devices, simple text message including barcode number and associated text will be delivered. Otherwise, subject to the mobile device supporting the required display dimensions and color depth, a barcode image, picture, and/or multimedia content will be delivered.

24 Claims, 6 Drawing Sheets

U.S. PATENT DOCUMENTS

| | | | |
|---|---|---|---|
| 7,155,405 B2 * | 12/2006 | Petrovich | 705/26 |
| 7,305,442 B1 * | 12/2007 | Lundy | 709/206 |
| 2002/0016818 A1 | 2/2002 | Kirani et al. | |
| 2002/0091569 A1 | 7/2002 | Kitaura et al. | |

FOREIGN PATENT DOCUMENTS

| | | |
|---|---|---|
| EP | 1 178 421 A2 | 2/2002 |
| GB | 2 361 570 A | 10/2001 |
| GB | 2 362 012 A | 11/2001 |
| WO | WO-9815091 | 4/1998 |
| WO | WO-01/95267 A1 | 12/2001 |
| WO | WO-02/15121 A1 | 2/2002 |
| WO | WO-02/27593 A1 | 4/2002 |

OTHER PUBLICATIONS

Minutes of the oral proceedings (examining division) in EP Application No. 03 750 964.3 with Annex to the communication dated Apr. 16, 2007.

Summons to attend oral proceedings in EP Application No. 03 750 964.3 with Annex to the communication dated Feb. 9, 2007.

Examination report in EP Application No. 03 750 964.3 with Annex to the communication dated Jun. 16, 2006.

* cited by examiner

OPTIMISED MESSAGES CONTAINING BARCODE INFORMATION FOR MOBILE RECEIVING DEVICES

CROSS-REFERENCE TO RELATED APPLICATION

This application is the U.S. national phase, pursuant to 35 U.S.C. §371, of international application No. PCT/GB2003/004131, published in English on Apr. 1, 2004 as international publication No. WO 2004/027662 A1, which claims the benefit of British application Ser. No. GB 022514.0, filed Sep. 17, 2002 and British application Ser. No. GB 0310692.9, filed May 9, 2003, the disclosure of which applications are incorporated herein in their entireties by this reference.

BACKGROUND OF THE INVENTION

The present invention relates to coupons, in particular delivering coupons containing barcodes to a mobile device.

The display of a mobile device may be used to generate bar codes for reading by a conventional bar code scanner. This has uses in coupon and ticket applications. The mobile solution has a number of unique aspects when compared to traditional methods such as paper or internet email. These include:

Instant Delivery. The barcode is delivered to the mobile phone almost immediately.

Reach. The consumer can be reached wherever they are.

Increased Redemption. Unlike paper coupons which may be left behind, a mobile phone is normally carried everywhere.

GB Patent Application Number GB2361570 to British Airways discloses a method of operating a ticketing System. A reservation centre generates data representing a ticket which is broadcast to a mobile station e.g. a cellular phone. The data from the mobile station can then be used to verify the transaction e.g. via a reader linked to a reservations computer. The ticket data can be sent in the form of a text e.g. SMS message or in browser readable format and is preferably in machine readable code. Preferably, the reader is an optical bar or pin code reader. The system is preferably used for air travel. The problems with the disclosed system are that:

There doesn't appear to be a way of enforcing single redemption of a ticket (for security).

It relies on a "SIM toolkit" application in the handset to translate the ticket number into a barcode image. It would be advantageous to deliver the actual barcode image in the message. The SIM toolkit has a number of problems. Many network operators discourage or prevent downloading of applications into the SIM card. SIM storage is limited and it's harder to update the software on all of the phones.

International Patent Application number WO 01/95267 to Nokia relates to the provision of goods and services. Receipt data corresponding to a purchase of predetermined goods or a service are downloaded to a mobile handset and displayed as a bar code. A vending delivery station receives the receipt data from the handset and enables the provision of the purchase goods or service to the customer. In one example, cinema tickets are provided, printed by a ticket printer. The problem with the system is that it requires the consumer to collect tickets which are printed by a vending station before entry. It would be advantageous to simply treat the phone/barcode as a ticket which is scanned at the actual entry point, thus eliminating the queuing/inconvenience and printing.

The publication discloses MPEG film previews when browsing the cinema options. This is not however included as part of the ticket. It would be advantageous to provide multimedia tickets to phones that can support their viewing.

GB Patent Application Number GB2362012 to IBM discloses Paying for goods and services without needing to carry many cards. A customer, who has registered information such a credit card number with a server, receives payment information as an identification code when he/she pays for a purchase at a store. The payment information can be transmitted wirelessly to the cash register in store, or displayed as a two-dimensional barcode on display of the terminal and read by a barcode reader of the cash register. The payment information is associated with sales information and sent to the server which associates the payment information with the registered information for the customer, seeks approval from the appropriate credit institution, and sends an approval number to the store. A ticket processing system embodiments is also described.

SUMMARY

The problem with both the Nokia and IBM systems is that they don't facilitate operation with a variety of phones with different messaging formats and display or communication capabilities. For example, it would be advantageous for one system to support mobile phones that do or do not support "Picture Messaging" or Bluetooth.

In this document, including the specification and claims, the term coupon includes vouchers and tickets.

It is an object of the present invention to deliver coupons to a mobile device.

According to a first aspect of the present invention, there is provided a system comprising:

a message processor means for generating message data comprising a coupon;

a mobile device;

a message optimiser means for generating an optimised message responsive to said message data and the capabilities of said mobile device; and a communication means for transmitting said optimised message to said mobile device.

Preferably the system further comprises a database means for storing capabilities of mobile devices.

Preferably said capabilities comprise at least one device attribute associated with a mobile device type.

Typically said attribute comprises a display dimension.

Typically said attribute comprises a colour depth.

Preferably said communication means comprises a gateway means for transmitting said optimised message to a network.

Preferably said communication means further comprises a router means for selecting a gateway means for message transmission.

Preferably said coupon comprises a barcode number.

Optionally said coupon comprises barcode symbology.

Optionally said coupon comprises a barcode image.

Optionally said coupon comprises text content.

Optionally said optimised message further comprises multimedia content.

Typically said multimedia content comprises video.

Optionally said multimedia content comprises audio.

Optionally said multimedia content comprises a photograph.

Optionally said system comprises a mobile device type identifier.

Typically said message data comprises said mobile device type identifier.

Preferably said message optimiser is responsive to said capabilities corresponding to said mobile device type identifier.

Preferably said system further comprises a barcode generator means for generating barcodes.

Optionally said generated barcodes are random barcodes.

Preferably said system further comprises a barcode encoder means for encoding barcodes.

According to a second aspect of the present invention, there is provided a method for delivering a message to a mobile device comprising the steps of:
  generating message data comprising a coupon;
  generating an optimised message responsive to said message data and the capabilities of said mobile device; and
  transmitting said optimised message to said mobile device.

Preferably said method further comprises the step of inputting capabilities of mobile devices.

Preferably said method further comprises the step of storing capabilities of mobile devices.

Preferably said capabilities comprise at least one device attribute associated with a mobile device type.

Typically said attribute comprises a display dimension.

Typically said attribute comprises a colour depth.

Preferably said method further comprises the step of transmitting said optimised message to a network.

Preferably said method further comprises the step of selecting a gateway means for message transmission.

Preferably said coupon comprises a barcode number.

Optionally said coupon comprises barcode symbology.

Optionally said coupon comprises a barcode image.

Optionally said optimised message further comprises multimedia content.

Typically said multimedia content comprises video.

Optionally said multimedia content comprises audio.

Optionally said multimedia content comprises a photograph.

Optionally said message data comprises a mobile device type identifier.

Preferably said method further comprises the step of retrieving capabilities corresponding to a mobile device type identifier.

Preferably said step of generating an optimised message is responsive to said retrieved capabilities.

Preferably said step of generating an optimised message comprises downgrading said generated message data.

Preferably said method further comprises the step of generating barcodes.

Preferably said generated barcodes are random barcodes.

Preferably said method further comprises the step of encoding barcodes.

According to a third aspect of the present invention, there is provided a computer program for carrying out the method above-described.

According to a fourth aspect of the present invention, there is provided a carrier for carrying the computer program.

According to a fifth aspect of the present invention, there is provided a message comprising a coupon and multimedia content.

Typically said multimedia content comprises video.

Optionally said multimedia content comprises audio.

Optionally said multimedia content comprises a photograph.

Preferably said coupon comprises a barcode number.

Optionally said coupon comprises barcode symbology.

Optionally said coupon comprises a barcode image.

In order to provide a better understanding of the present invention, an embodiment will now be described by way of example only and with reference to the accompanying Figures, in which.

BRIEF DESCRIPTION OF THE DRAWINGS

DETAILED DESCRIPTION OF PREFERRED EMBODIMENTS

The invention is a platform that functions to deliver coupons to a mobile device. Typically the coupons contain barcodes that are redeemed by scanning the display of the mobile device.

Figure 1:
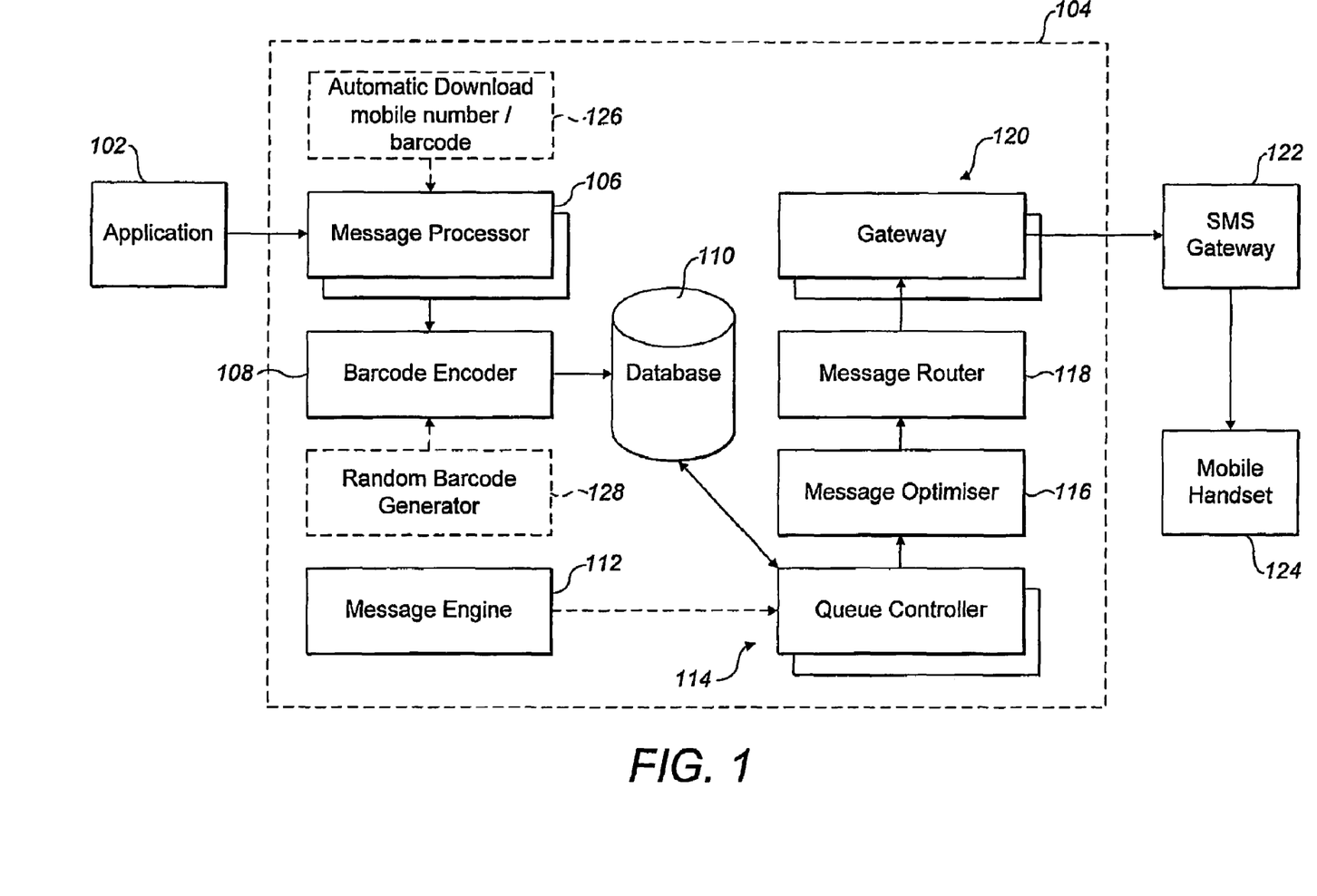
FIG. 1 illustrates, in schematic form, the core technology platform in accordance with the present invention.

With reference to FIG. 1, the application 102 interfaces to the core technology platform 104 for advanced mobile messaging using XML content delivered over the internet http protocol.

The Message Processor 106 is started automatically in response to the delivery of message content to a specified URL.

The message processor receives the mobile phone number, barcode number and symbology, handset/device type and additional message content for delivery to the device. The handset/device type is optional. When it is provided, it is stored in the database against the mobile number. In the case of future messages for that mobile number where the device type is not provided, then the recorded device type is retrieved. This avoids the need to capture the handset/device type on multiple occasions or for different purposes such as coupon or ticket delivery.

The message content is provided in XML format, and delivered using the http post protocol. The XML is a list of messages containing information including:
  Mobile phone number
  Barcode number and symbology
  Additional text content (optional)
  Recipient details such as Name (optional)
  Handset and Network details (optional)

The Message Processor 106 processes the messages and stores them in the database for retrieval by the Queue Controller 114.

The Barcode Encoder 108 is invoked to generate barcode images from the barcode number and symbology. The images are stored as Pictures in the database 110.

Customer systems can be integrated with the mobile messaging platform through the message processor 106.

The database 110 stores the following core entities:
  Barcodes—Barcodes with a particular number and symbology Pictures—Pictures (may represent a barcode image)

Handset—information on a particular handset including owner details, mobile number, model, etc.

Messages—Outbound and inbound messages

Gateways—Network messaging gateways

The barcode encoder 108 generates the barcode image for a specified barcode and symbology. The resulting picture is stored in the database 110 in binary form. The encoder supports both linear barcodes such as EAN-8, EAN-13, UPC-A, etc. as well as 2D barcodes such as DataMatrix, PDF-417, etc.

A similar approach can be used for other advanced message types such as smart tickets.

The Message Engine 112 starts a separate queue controller 114 for each message priority level (1-3). The Message engine 112 also starts the gateways 120.

The Queue Controllers 114 poll the database 110 at periodic intervals to retrieve all messages with the relevant priority. The messages are then fed through the Message Optimiser 116 and Message Routers 118 and out through the selected gateway 120.

The Message Optimiser 116 chooses the optimal message format depending on the capabilities of the target handset. For basic handsets, a simple text message will be delivered. Otherwise, subject to the handset supporting the required display dimensions and colour depth, pictures are delivered using the richest format available.

The Message Optimiser 116 overcomes many of the problems inherent with known methods. In particular, the wide range of device types/models and message protocols restrict many alternative solutions to providing support for only a limited number of users. Devices can vary in their support for particular picture messaging protocols such as Nokia Smart Messaging or EMS (Enhanced Message Service). Device display capabilities such as display resolution also constrain the barcode symbologies and codes that may be represented. The present invention enables a comprehensive support of the installed base of devices to be provided.

The Message Optimiser 116 takes the barcode image generated by the Barcode Encoder 108, and device type and optimises the messages for transmission based on the capabilities of the target handset.

Where the target device does not have sufficient capability to receive or represent the message correctly, the content is downgraded accordingly. Ultimately, for a handset that supports only SMS text messaging, then the barcode number and associated text is transmitted. E.g. "Barcode <12345670>. Ticket for Event at Venue on Date". In the case of a text-only barcode, the barcode is redeemed by keying-in the number. This is also the common, automatic approach when a barcode image fails to scan.

The downgrading of the content is controlled by a hierarchy of rules based on the device capability. This includes:

1. MMS support

2. EMS support

3. Nokia Smart Message support

4. Display Resolution

If the display resolution is insufficient to represent the barcode, then the message is downgraded to text.

A table of device attributes associated with a device type is maintained in the database 110. This table includes the following information:

1. Handset/Device Type

2. MMS Support

3. EMS Support

4. Nokia Smart Message Support

5. Display Resolution

6. Colour Depth (1=mono)

7. Bluetooth support

8. Java support

Where the handset model is not known, then the capabilities of the database device entry with id of "DEFAULT" are assumed. This enables such behaviour to be controlled. i.e. whether to assume that an unknown handset supports Nokia picture messages or not.

The barcode image can also be a 2D barcode. A 2D barcode enables a larger amount of information to be contained within the barcode.

If the device has a multimedia capability, then messages can also be enhanced by the addition of moving video, colour images, and audio clips. Mobile phones may support MMS (Multimedia Messaging Service). In this case a ticket for a music concert could include a short piece of video of the band, an image of the cover of the new album, and an audio clip for a recently released track in addition to the barcode. Similarly, in order to promote a brand, a coupon could contain a video clip and audio from a TV advertisement in addition to the barcode. In security applications, a photograph could be included with the barcode.

The message router 118 chooses the optimal network gateway based on rules stored in the database. Multiple gateway connections can be supported for load balancing and scalability. Where there is more than one possible route, the gateway with the lowest latency is chosen.

The gateways 120 are the route to the external SMS gateways or SMS centres over a network. The gateways 120 maintain a queue of messages sorted by priority. A number of different SMS gateway technologies are supported including XML/http, SMPP, GSM terminals, etc. Alternatively the gateway 120 can be an email gateway, delivering the messages as an email message. Pictures may be attached as a GIF image.

The SMS gateway 122 is a gateway to the mobile network short messaging service. Alternatively, this may be a direct connection to the mobile network operator's messaging centre. The SMS gateway may support enhanced messages (EMS) such as picture messages. The SMS gateway may be a multi-media message (MMS) gateway for delivery of multi-media messages including high-resolution colour images and video.

The mobile handset 124 can be a mobile phone or other wireless-enabled device such as a PDA.

The core technology platform 104 supports processes in a number of applications. Additional components are defined to support the specific steps in such solutions. Thus the system also may include an Automatic Download component 126 and a Random Barcode Generator component 128 for customisation of the system as described below for retail coupon and security applications respectively.

Figure 2:
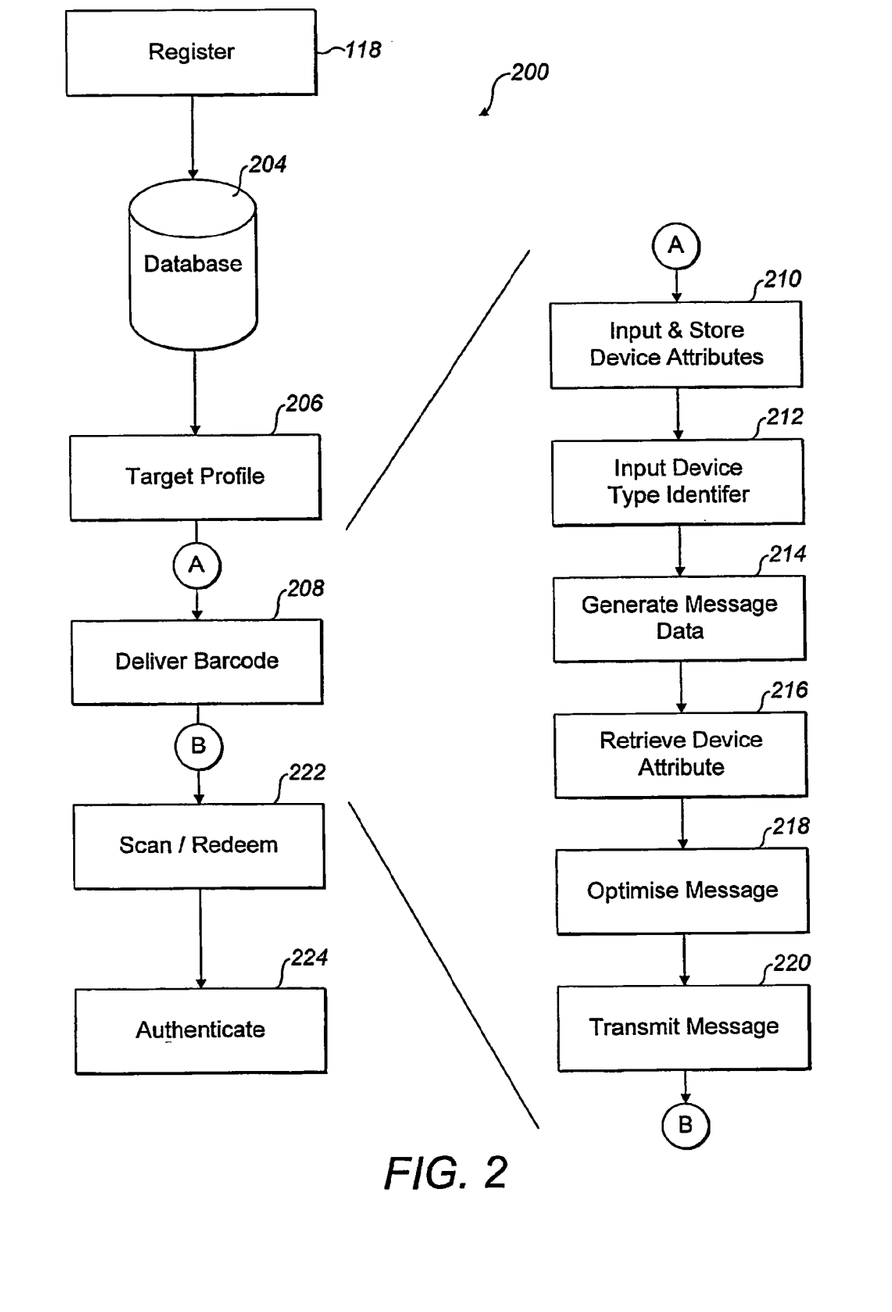
FIG. 2 illustrates, in schematic form, the core mobile barcode generation, delivery and redemption process in accordance with the present invention.

With reference to FIG. 2 the core mobile barcode generation, delivery, and redemption process 200 is depicted.

The consumer opts-in to receive barcodes by registering (step 202) with the supplier. Registration may be through a variety of channels including internet web site, telephone call centre, paper forms, or text message.

The registration details are stored in the database (step 204). The database contains customer contact and profiling information. This information includes:

Customer details and contact information including mobile number and possibly name, email address, postal address, photograph, etc.
Customer demographics including age, sex, etc.
Customer preferences
Customer buying history In the Target Profile step (step 206), an offer for a product, service, or information is matched with the database of customer profiles. The matching criteria may include one or more of:
Demographics
Preferences/Product Criteria
Buying History The result of the match is a list of mobile numbers for contact purposes and profile information for message personalisation.

The specified barcodes are generated from the number(s) provided and delivered (step 208) to the list of mobile numbers using the messaging platform. This step is expanded towards the right hand side of FIG. 2.

After inputting and storing (step 210) device attributes defining the device capabilities in the database and inputting (step 212) a device type identifier (e.g. model of mobile phone), the system generates (step 214) message data comprising a coupon and optionally the device type identifier.

The system retrieves (step 216) device attributes defining the device capabilities corresponding to the mobile device type identifier and generates (step 218) an optimised message responsive to the message data and the retrieved capabilities.

Finally in the delivery step, the system transmits (step 220) the optimised message to the target mobile device via one or more gateways through a network.

The delivery of a barcode is recorded in the database for subsequent authentication purposes.

The barcode is redeemed (step 222) in the same way as any product containing a barcode, by scanning the mobile phone display using a conventional barcode scanner. An alternative to scanning the barcode for redemption could be to use Bluetooth or an alternative radio or electro-magnetic transmission method.

The barcode is authenticated (step 224) by examining the barcode delivery records and retrieving the associated customer details. The customer details, possibly including a photograph, may be displayed on a computer display for human validation.

Barcode redemption is recorded in the database for audit purposes.

If this barcode is to be redeemed only once, then the barcode record in the database is marked as redeemed, and cannot be redeemed again.

Figure 3:
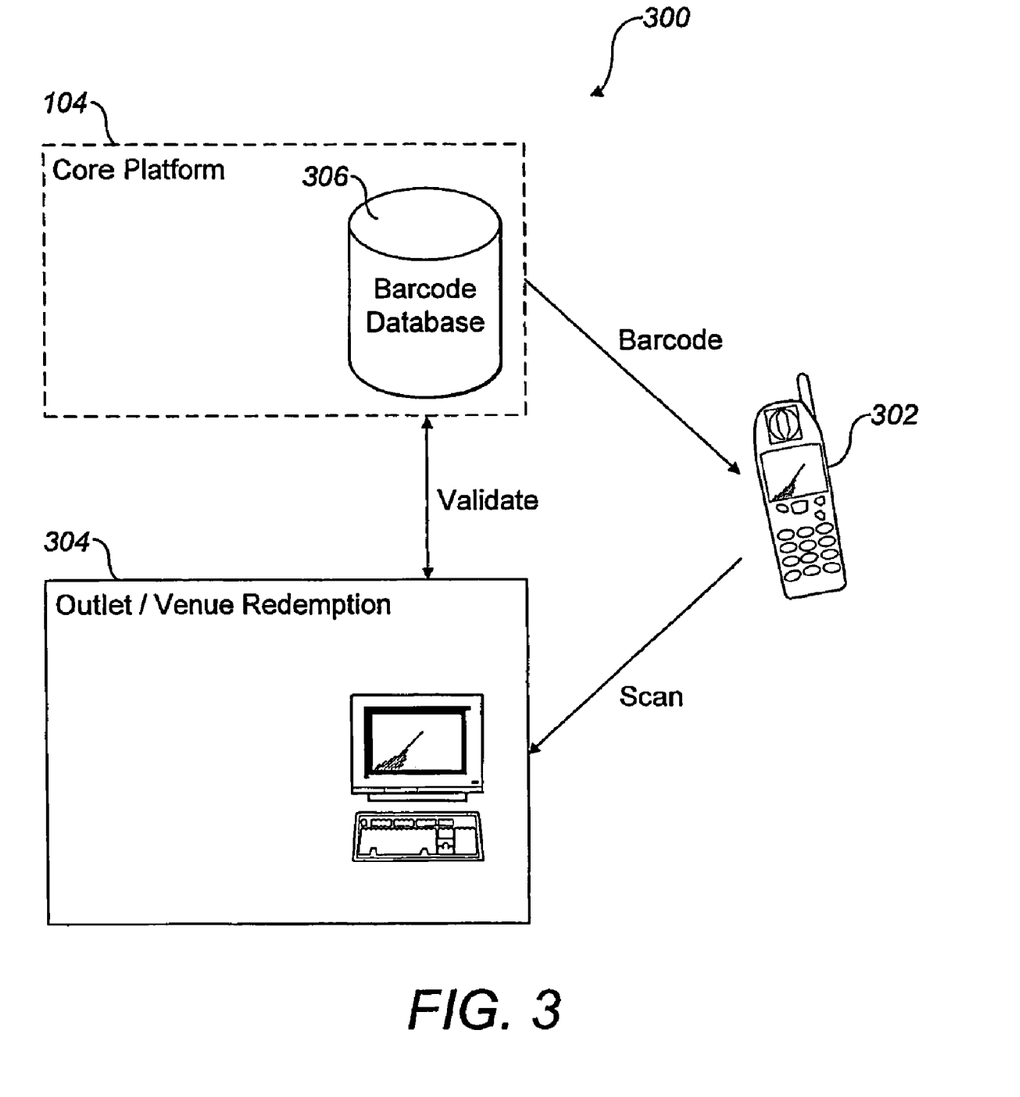
FIG. 3 illustrates, in schematic form, the redemption architecture and process in accordance with the present invention.

With reference to FIG. 3, the redemption process 300 is shown. In the case of a coupon, the barcode is sent to the mobile device 302 and is scanned at the outlet or venue 304, and the number is used to identify the offer by searching the database in the core technology platform 104 according to the present invention. In the case of a single-redemption barcode such as a ticket, the barcode is validated against the database 306. The barcode entry in the database is then marked as 'redeemed' to prevent multiple redemption of the same barcode.

Specific solutions based on the core technology platform are defined and will be presented below for a number of markets:
Retail Coupons
Ticketing
Security With reference to FIG. 4, the mobile barcode solution process 400 is customised for the retail coupon market. The mobile barcode represents a discount coupon which is redeemed by scanning in a retail outlet.

Barcodes representing discount coupons may be redeemed multiple times without any authentication. Indeed, viral marketing may be encouraged through forwarding of the mobile barcode to friends and family.

Figure 4:
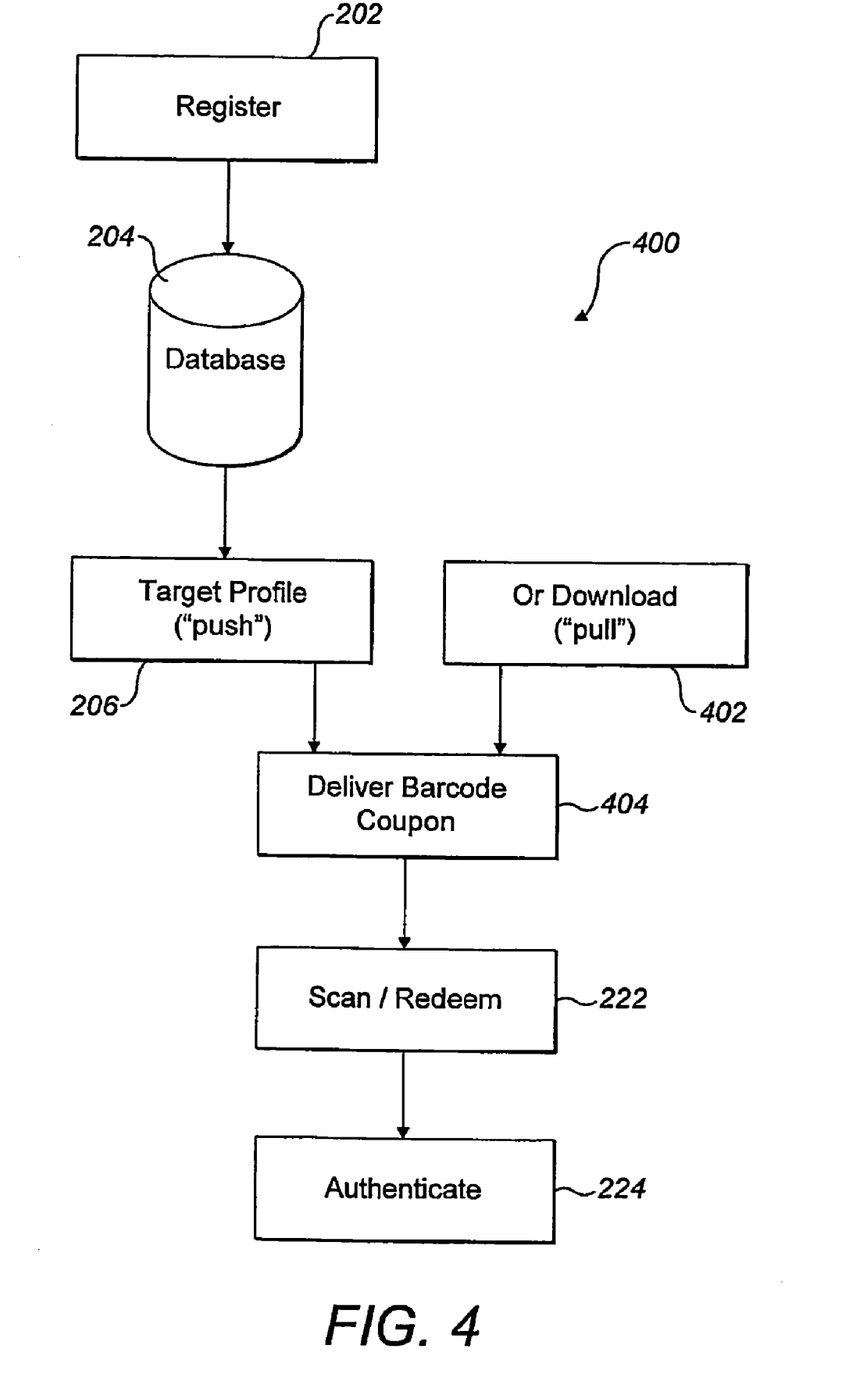
FIG. 4 illustrates, in schematic form, the mobile barcode generation, delivery and redemption process customised for the retail coupon market.
Figure 5:
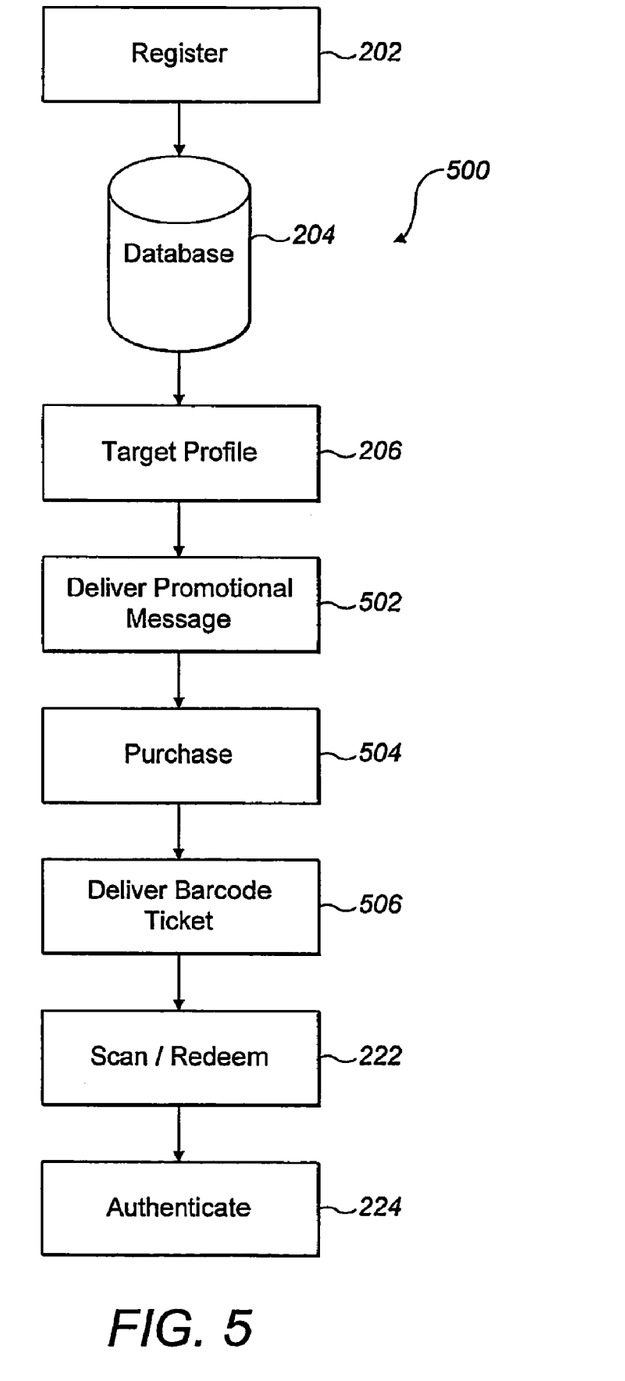
FIG. 5 illustrates, in schematic form, the mobile barcode generation, delivery and redemption process customised for ticketing applications.
Figure 6:
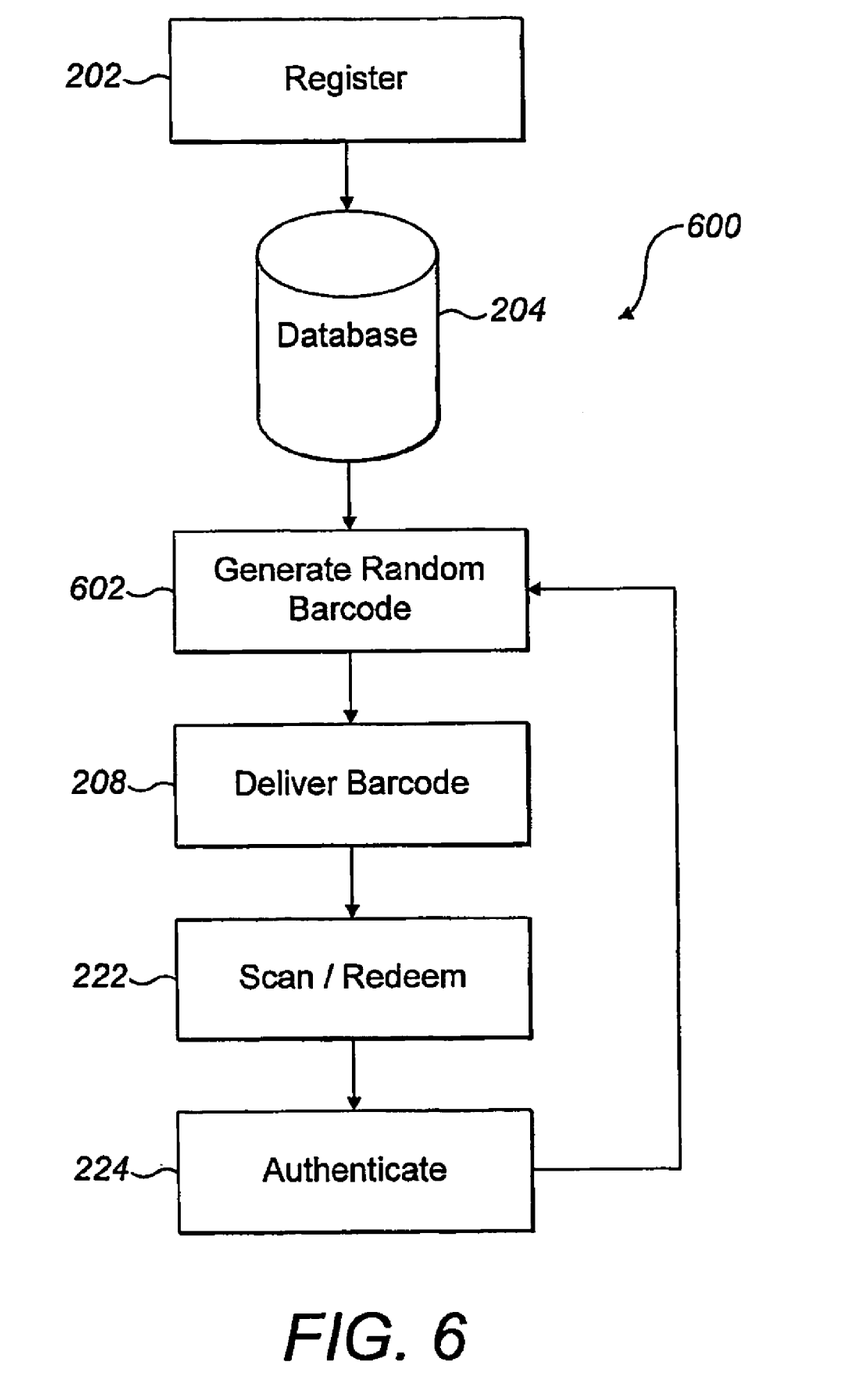
FIG. 6 illustrates, in schematic form, the mobile barcode generation, delivery and redemption process customised for security applications.

In FIGS. 4, 5 and 6, each of the steps having numbering common with FIG. 2 are described above.

The Coupon Download ("pull") (step 402) is initiated by a consumer via a number of channels including:
Web site
Telephone
Mobile text Message sent to a supplier mobile number In each case, the recipient's mobile number is captured in order that the mobile barcode coupon may be delivered (step 404).

The solution builds on the core process with an Automatic Download component 126 shown in FIG. 1. The automatic download component 126 is invoked from a web site, automated telephone system, or through receipt of a text message. The component 126 takes the mobile number and barcode number and invokes the Message Processor 106 using XML/http to deliver the mobile barcode.

With reference to FIG. 5, the mobile barcode solution process 500 is customised for ticketing applications. The mobile barcode represents a ticket that is redeemed by scanning the phone display at the venue.

Specific steps in the mobile ticketing solution are:
Deliver Promotional Message (step 502)
Purchase (step 504)

With reference to FIG. 5, the first steps (down to but not including Purchase (step 504)) are optional.

An example promotional message might be:

Ticket available for Sat. Call 0800 123456 or reply "1" to buy.

The promotional message may be delivered as a simple text message, or might be a richer message including text and pictures.

The purchase may be achieved through a number of channels including:
Ticket sales call centre
Web site
Text message reply Payment may be received through one of many existing methods including credit card and existing account. When payment is accepted, then the mobile barcode ticket is delivered (step 506).

As the Message Processor supports simple text messages as well as more sophisticated data (barcodes), the promotional message is delivered using the core platform.

The ticket purchase is achieved using traditional methods.

With reference to FIG. 6, the mobile barcode solution process 600 is customised for security applications. The mobile barcode represents an identity that is validated by scanning the phone display. Upon validation, access can be granted to a secure location, or a product can be provided.

There is an automatic random barcode generation step 602. A new random barcode may optionally be generated and delivered every time a barcode is redeemed.

The solution builds on the core process with the Random barcode generator component 128 shown in FIG. 1. The Random barcode generator 128 automatically generates a random barcode number. The barcode number generated is unique amongst unredeemed barcodes in the database.

Key features of the solutions described herein are:
Targeting using a customer profile database
Dynamic barcode image generation from barcode number and symbology
Delivery of barcode to mobile phone or other wireless device
Redemption and authentication of barcode by scanning display
Specific processes for particular applications The solutions described above are implemented using Java 2 Enterprise Edition, SQL, and XML (extensible markup language). Alternative technologies could however be used to implement the solutions described above.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code of intermediate source and object code such as in partially compiled form suitable for use in the implementation of the processes according to the invention. The carrier may be any entity or device capable of carrying the program.

For example, the carrier may comprise a storage medium, such as ROM, for example a CD ROM or a semiconductor ROM, or a magnetic recording medium, for example, floppy disc or hard disc. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Further modifications and improvements may be added without departing from the scope of the invention herein described.

The invention claimed is:

1. A system for delivering a barcode comprising;
    a mobile device;
    a mobile device type identifier associated with said mobile device;
    a message processor that generates message data comprising a coupon;
    a database for storing the display capabilities and picture messaging protocols of mobile devices;
    a message optimizer that generates an optimized message responsive to said message data and responsive to the stored display capabilities and picture messaging protocols corresponding to said mobile device type identifier; and
    a communication module that transmits said optimized message to said mobile device,
    wherein said coupon comprises a barcode image; and said message optimizer generates said optimized message by downgrading said message data responsive to said stored display capabilities and picture messaging protocols.

2. The system according to claim 1, characterized in that said capabilities comprise at least one device attribute associated with a mobile device type.

3. The system according to claim 2, characterized in that said device attribute comprises a display dimension and a colour depth.

4. The system according to claim 1, characterized in that said coupon comprises a barcode number, barcode symbology, a barcode image, and text content.

5. The system according to claim 1, characterized in that said optimized message comprises multimedia content.

6. The system according to claim 5, characterized in that said multimedia content is selected from the group consisting of video, audio, a photograph and combinations thereof.

7. The system according to claim 1, characterized in that said message data further comprises said mobile device type identifier.

8. The system according to claim 1, characterized in that said system further comprises a barcode generator that generates barcodes.

9. The system according claim 8, characterized in that said generated barcodes are random barcodes.

10. The system according to claim 8, characterized in that said system further comprises a barcode encoder that encodes said generated barcodes.

11. A method for delivering a message to a mobile device comprising the steps of:
    generating message data comprising a coupon;
    receiving a mobile device type identifier associated with said mobile device;
    storing display capabilities and picture messaging protocols of mobile devices;
    generating an optimized message responsive to said message data and to the stored display capabilities and picture messaging protocols corresponding to said mobile device type identifier; and
    transmitting said optimized message to said mobile device,
        wherein said coupon comprises a barcode image; and said step of generating an optimized message comprises downgrading said message data responsive to said stored display capabilities and picture messaging protocols.

12. The method according to claim 11, characterized in that said capabilities comprise at least one device attribute associated with a mobile device type.

13. The method according to claim 11, characterized in that said device attribute comprises a display dimension and a colour depth.

14. The method according to claim 11, characterized in that said coupon comprises a barcode number, barcode symbology, and a barcode image.

15. The method according to claim 11, characterized in that said optimized message comprises multimedia content.

16. The method according to claim 15, characterized in that said multimedia content is selected from a group consisting of video, audio, a photograph and combinations thereof.

17. The method according to claim 11, characterized in that said method further comprises the step of generating barcodes.

18. The method according to claim 17, characterized in that said generated barcodes are random barcodes.

19. The method according to claim 17, characterized in that said method further comprises the step of encoding said generated barcodes.

20. A computer-readable medium whose contents cause a system to perform a method comprising the steps of:
    generating message data comprising a coupon;
    receiving a mobile device type identifier associated with said mobile device;

storing display capabilities and picture messaging protocols of mobile devices;

generating an optimized message responsive to said message data and to the stored display capabilities and picture messaging protocols corresponding to said mobile device type identifier; and transmitting said optimized message to said mobile device, wherein said coupon comprises a barcode image; and said step of generating an optimsed message comprises downgrading said message data responsive to said stored display capabilities and picture messaging protocols.

21. The system according to claim 1, wherein said message processor starts automatically in response to delivery of message content comprising a barcode number and a barcode symbology; and said message processor comprises a barcode encoder that dynamically generates said barcode image from said barcode number and said barcode symbology.

22. The system according to claim 1, wherein said communication module comprises a plurality of gateways for transmitting said optimized message to a network; and said communication module comprises a router for selecting at least one of said plurality of gateways for message transmission, said selecting being based on rules.

23. The method according to claim 11, wherein:

said step of generating message data starts automatically in response to delivery of message content comprising a barcode number and a barcode symbology; and said step of generating message data further comprises dynamically generating said barcode image from said barcode number and said barcode symbology.

24. The method according to claim 11, wherein the method further comprises the step of selecting at least one of a plurality of gateways for transmitting said optimized message to a network, said selecting being based on rules.

* * * * *

UNITED STATES PATENT AND TRADEMARK OFFICE
CERTIFICATE OF CORRECTION

PATENT NO. : 7,693,744 B2  Page 1 of 1
APPLICATION NO. : 10/527632
DATED : April 6, 2010
INVENTOR(S) : Ronald Forbes It is certified that error appears in the above-identified patent and that said Letters Patent is hereby corrected as shown below:

Title page 1, (87), *PCT Pub. No.: WO2004/022662* should read *PCT Pub. No.: WO2004/027662*.

Signed and Sealed this

Twenty-eighth Day of September, 2010

David J. Kappos
*Director of the United States Patent and Trademark Office*